US011896009B2

(12) United States Patent
Cabrera Pino et al.

(10) Patent No.: US 11,896,009 B2
(45) Date of Patent: Feb. 13, 2024

(54) BIOACTIVE COMPOSITION FOR IMPROVING STRESS TOLERANCE OF PLANTS

(71) Applicant: FYTEKO, Woluwe Saint Lambert (BE)

(72) Inventors: Juan-Carlos Cabrera Pino, Liège (BE); Guillaume Wegria, Saint-Gilles (BE)

(73) Assignee: FYTEKO, Anderlecht (BE)

( * ) Notice: Subject to any disclaimer, the term of this patent is extended or adjusted under 35 U.S.C. 154(b) by 0 days.

(21) Appl. No.: 15/760,468

(22) PCT Filed: Sep. 15, 2016

(86) PCT No.: PCT/EP2016/071810
§ 371 (c)(1),
(2) Date: Mar. 15, 2018

(87) PCT Pub. No.: WO2017/046237
PCT Pub. Date: Mar. 23, 2017

(65) Prior Publication Data
US 2018/0242579 A1    Aug. 30, 2018

(30) Foreign Application Priority Data

Sep. 15, 2015 (EP) ................................. 15185212
Jan. 21, 2016 (BE) ................................. 2016/0011

(51) Int. Cl.
*A01N 37/38* (2006.01)
*A01N 65/00* (2009.01)
*A01G 7/06* (2006.01)

(52) U.S. Cl.
CPC ............... *A01N 37/38* (2013.01); *A01G 7/06* (2013.01); *A01N 65/00* (2013.01)

(58) Field of Classification Search
CPC ........... A01N 37/38; A01N 65/00; A01G 7/06
See application file for complete search history.

(56) References Cited

U.S. PATENT DOCUMENTS

| 6,033,712 A | 3/2000 | Greenshields et al. | |
| 6,632,444 B1 * | 10/2003 | Zhou ....................... | A61K 8/062 424/401 |
| 2004/0152912 A1 * | 8/2004 | Taniguchi ............. | C07C 69/734 560/55 |
| 2004/0236148 A1 * | 11/2004 | Yu .......................... | C07C 217/22 562/465 |
| 2004/0259732 A1 | 12/2004 | Asrar et al. | |
| 2005/0048008 A1 * | 3/2005 | Gupta ..................... | A61Q 5/00 424/59 |
| 2007/0232495 A1 | 10/2007 | Nappa et al. | |
| 2008/0102132 A2 | 5/2008 | Giner et al. | |
| 2012/0027691 A1 * | 2/2012 | Desai ..................... | A61K 9/007 424/45 |
| 2015/0343075 A1 * | 12/2015 | Raff ........................ | A61P 43/00 424/489 |
| 2016/0175349 A1 * | 6/2016 | Hasegawa ............. | A61K 36/185 424/682 |

FOREIGN PATENT DOCUMENTS

| WO | WO-9851275 A1 * | 11/1998 | ............... A61K 8/27 |
| WO | 03-000288 | 1/2003 | |
| WO | 2010-027594 | 3/2010 | |
| WO | WO-2015016285 A1 * | 2/2015 | ............. A61K 33/00 |

OTHER PUBLICATIONS

W. Tiyaboonchai, "Chitosan Nanoparticles: A Promising System for Drug Delivery," Naresuan University Journal 2003; 11(3): 51-66.*
Apel and Hirt, "Reactive oxygen species: metabolism, oxidative stress, and signal transduction", Annu Rev Plant Biol. 2004, 55:373-399.
Bharti et al., "The greater effectiveness of Glomus mosseae and Glomus intraradices in improving productivity, oil content and tolerance of salt-stressed mentholmint (*Mentha arvensis*)" J Sci Food Agric. 2013, 93:2154-2161.
Blum et al., "Effects of ferulic acid and some of its microbial metabolic products on radicle growth of cucumber" Journal of chemical ecology. 1984, 10(8):1169-1191.
Bunzel et al., "Semipreparative isolation of dehydrodiferulic and dehydrotriferulic acids as standard substances from maize bran", J Sep Sci. Sep. 2004;27(13):1080-6.
Carpita, "Structure and Biogenesis of the Cell Walls of Grasses", Annu Rev Plant Physiol Plant Mol Biol. Jun. 1996;47:445-476.
Dos Santos et al., "Lignification and related enzymes in Glycine max root growth-inhibition by ferulic acid" Journal of Chemical Ecology. 2004, 30(6):1203-1212.
Einhellig et al., "Interactions of temperature and ferulic acid stress on grain sorghum and soybeans" Journal of chemical ecology. 1984, 10(1):161-170.
Lehman et al., "Evaluation of ferulic acid uptake as a measurement of allelochemical dose: effective concentration" Journal of Chemical Ecology. 1999, 25(11):2585-2600.
Li et al. "Ferulic acid pretreatment enhances dehydration-stress tolerance of cucumber seedlings" Biologia Plantarum. 2013, 57(4):711-717.
Liebl et al., "Inhibition of pitted morning glory (*Ipomoea lacunosa* L.) and certain other weed species by phytotoxic components of wheat (*Triticum aestivum* L.) straw" Journal of Chemical Ecology. 1983, 9(8):1027-1043.
Morrison and Buxton, "Activity of phenylalanine ammonia-lyase, tyrosine ammonia-lyase, and cinnamyl alcohol dehydrogenase in the maize stalk", Crop Sci. 1993, 33:1264-1268.

(Continued)

Primary Examiner — Monica A Shin
(74) Attorney, Agent, or Firm — NIXON & VANDERHYE

(57) ABSTRACT

Disclosed is a composition for improving stress tolerance of plants including at least one hydroxycinnamic derivative oligomer, and optionally a water-solubilizing agent. Also disclosed is a method for improving stress tolerance of a plant including applying such composition on the plant.

16 Claims, 6 Drawing Sheets

(56) References Cited

OTHER PUBLICATIONS

Ralph et al., "Identification and synthesis of new ferulic acid dehydrodimers present in grass cell walls", J. Chem. Soc., Perkin Trans. 1. 1994,0,3485-3498.

Rasmussen et al., "Synergistic inhibitory effects ofp-coumaric and ferulic acids on germination and growth of grain sorghum" Journal of Chemical Ecology. 1977, 3(2):197-205.

Santiago et al., "Changes in phenolic concentrations during recurrent selection for resistance to the Mediterranean corn borer (*Sesamia nonagrioides* Lef.)", J Agric Food Chem. Sep. 10, 2008;56(17):8017-22.

Shoresh et al., "Induced systemic resistance and plant responses to fungal biocontrol agents", Annu Rev Phytopathol. 2010;48:21-43.

Turner et al., "Microbial decomposition of ferulic acid in soil" Journal of Chemical Ecology. 1975, 1(1):41-58.

Verbruggen and Hermans, "Proline accumulation in plants: a review" Amino Acids. 2008, 35:753-759.

Verma et al., "Antagonistic fungi, *Trichoderma* spp.: Panoply of biological control" Biochem Eng Journal. 2007, 37:1-20.

Yeoh et al., "Sequence analysis and gene expression of putative oil palm chitinase and chitinase-like proteins in response to colonization of Ganoderma boninense and Trichoderma harzianum" Mol Biol Rep. 2013, 40:147-158.

Yu et al., "Phytotoxic substances in root exudates of cucumber (*Cucumis sativus* L.)" Journal of Chemical Ecology. 1994, 20(1):21-31.

Buanafina et al., "Feruloylation in grasses: current and future perspectives", Mol Plant. Sep. 2009;2(5):861-72.

International search report for application PCT/EP2016/071810, dated Oct. 25, 2016.

European search report for application EP15185212.6, dated Nov. 11, 2015.

* cited by examiner

BIOACTIVE COMPOSITION FOR IMPROVING STRESS TOLERANCE OF PLANTS

FIELD OF INVENTION

The present invention relates to a bioactive composition for improving stress tolerance of plants. In particular, the present invention relates to a composition comprising at least one hydroxycinnamic derivative oligomer for improving plant tolerance to abiotic and biotic stress, increasing survival in adverse environmental conditions, obtaining better growth and providing a substantial yield advantage.

BACKGROUND OF INVENTION

Crop management is most commonly carried out by chemical products, for example fertilizers or pesticides, that ensure an efficacious plant protection but often interfers with the other biological components of the environment, determining irreversible imbalances. In addition, these products can cause serious damages for consumer's health as a consequence of their residues in food products. From this scenario, it emerges the need of a gradual decrease in the use of chemical tools in agriculture. Nowadays, agriculture is increasingly focused on the quality of products and on the environmental, hygienic and sanitary aspects. Therefore, agricultural practices are moving towards a sustainable management of agricultural crops, in order to ensure quantitative and qualitative product properties.

During the last decade, the studies on alternative environmental friendly technologies have received a strong impulse and have proposed a wide range of options, including agronomical, physical and biological control means (Verma et al., Biochem Eng Journal. 2007, 37:1-20; Shoresh et al., Annu Rev Phytopathol. 2000, 48:21-43; Bharti et al., J Sci Food Agric. 2013, 93:2154-2161; Yeoh et al., Mol Biol Rep. 2013, 40:147-158). In this regards, the use of biopesticides and biostimulants represent some of the most promising options.

Biopesticides are certain types of pesticides derived from such natural materials as animals, plants, bacteria, and certain minerals. Biopesticides fall into three major classes: (1) Microbial pesticides consist of a microorganism as the active ingredient. For example, fungi that control certain weeds; (2) Plant-Incorporated-Protectants (PIPs) are pesticidal substances that plants produce from genetic material that has been added to the plant and (3) Biochemical biopesticides, naturally occurring bioactive compounds or synthetically derived bioactive compounds that are structurally similar (and functionally identical) to their naturally occurring counterparts. Elicitors which are able to trigger immune defense responses in plants are one of the most widely used biopesticides. In general, biochemical biopesticides are characterized by a non-toxic mode of action that may affect the growth and development of a pest, its ability to reproduce, or pest ecology.

Plant biostimulants are bioactive substances and/or micro-organisms whose function when applied to plants or the rhizosphere is to stimulate natural processes to enhance/benefit nutrient uptake, nutrient efficiency, tolerance to abiotic stress, and crop quality. Biostimulants are capable of improving the qualities and the yield of harvests at a lower cost, by playing on the metabolism of the plant while reducing the detrimental impacts on the environment of the use of chemical compounds.

Biostimulants do not bring directly nutriments to plants and they have no direct action against pests but increase the capacity of plants to resist different abiotic and biotic stresses: lack of water, strong heat, excessive humidity, high salinity, toxic mineral or compounds, diseases or pests (bacteria, viruses, fungi, parasites or harmful insects). These stress conditions have a negative impact on crop production. Also, the use biostimulant, even at low concentration of the active ingredient/principle/compound can help to limit the use of fertilizers or pesticides by improving plants growth and global fitness. It is of high-interest in agriculture to improve the performances of crops with the aim of decreasing the total amounts of chemicals to be used.

Plant biostimulants generally fall within one of three main categories: plant hormones, amino substances and humic substances. Consistent with the foregoing, exemplary plant biostimulants include compositions based on seaweed extract, humic acid, amino acids, salicylic acid, bio-solids, hydrolyzed proteins, silicate, and/or synthetic compounds.

Cinnamic acid and its 4-hydroxysubstituted derivatives (namely p-coumaric acid, caffeic acid, ferulic acid and sinapic acid), form a family of natural products abundant in plants and generally known as cinnamates. In particular, ferulic acid, various diferulic acids and even triferulates are important components of plant cell walls in certain plant. In the cell wall, these compounds are esterified to the arabinose moieties of glucuronoarabinoxylans, a predominant component of the hemicellulose matrix. For instance, ferulic acid is considered as the predominant phenolic cross-linker in grass cell wall playing a significant role in cell-wall extensibility (Carpita N. C. Annu. Rev. Plant Physiol. Plant Mol. Biol. 1996, 47:445-476).

Oligomers of cinnamic acid are known as anti-inflammation agents, inhibitors of elastase and anti-oxidants. For example, WO2010/027594 discloses the use of such oligomers as anticoagulants.

Ferulic acid is also known as an antioxidant. For instance, the US patent application US2004/259732 discloses compositions for improving the yield of a plant comprising an antioxidant such as ferulic acid and derivatives.

The patent application JP-H-10338603 discloses cinnamic acid as a compound useful to prevent leaves and root death caused by pathogenic bacteria. WO03/000288 also discloses compositions for inducing an endogenous pathogen defense pathway in a plant, such compositions comprising ferulic acid. In addition, Li et al. (Biologia *Plantarum*. 2013, 57(4):711-717) have shown that cucumber seedlings watered during 2 days with Hoagland nutrient solution containing ferulic acid could protect plants from dehydration stress.

However, cinnamic acids and ferulic acid are reported since several years as phytotoxic agent (Turner et al., Journal of Chemical Ecology. 1975, 1(1):41-58; Rasmussen et al., Journal of Chemical Ecology. 1977, 3(2):197-205; Liebl et al., Journal of Chemical Ecology. 1983, 9(8):1027-1043; Blum et al., Journal of chemical ecology. 1984, 10(8):1169-1191) and are used by numerous plants as allelochemical inhibition agents (Einhellig et al., Journal of chemical ecology. 1984, 10(1):161-170; Dos Santos et al., Journal of Chemical Ecology. 2004, 30(6):1203-1212; Yu et al., Journal of Chemical Ecology. 1994, 20(1):21-31; Lehman et al., Journal of Chemical Ecology. 1999, 25(11):2585-2600).

The Applicants unexpectedly found that hydroxycinnamic derivative oligomers promote plant growth and development under various stresses conditions, in particular in adverse environmental conditions such as drought or mineral stress. This growth stimulation-mediated drought preparedness effect enhances effective water use under a range of drought stresses, from seasonal, mild water stress to severe, prolonged drought. This range of water stress situations is usually accompanied by heat stress.

The present invention therefore relates to a composition for improving stress tolerance of a plant comprising at least one hydroxycinnamic derivative oligomer.

SUMMARY

The present invention relates to a composition comprising at least one hydroxycinnamic acid derivative oligomer, wherein said composition comprises at most 3% of hydroxycinnamic acid derivative monomer, expressed in percent relative to the total hydroxycinnamic derivative oligomers of the composition, preferably at most 2%, more preferably at most 1%.

In one embodiment, the at least one hydroxycinnamic acid derivative is selected from the group comprising ferulic acid, p-coumaric acid, caffeic acid and sinapinic acid.

In one embodiment, the composition of the invention further comprises at least one water-solubilizing agent.

The present invention also relates to a composition for improving stress tolerance of a plant comprising at least one hydroxycinnamic acid derivative oligomer. In one embodiment, the at least one hydroxycinnamic acid derivative oligomer of the invention has a degree of polymerization of at least 2.

In one embodiment, said at least one hydroxycinnamic acid derivative is selected from the group comprising ferulic acid, p-coumaric acid, caffeic acid and sinapinic acid. In one embodiment, the composition of the invention comprises at least one ferulic acid oligomer, preferably diferulic acid.

In one embodiment, the composition of the invention comprises from 0.0001 to 200 ppm (parts per million) of said at least one hydroxycinnamic acid derivative oligomer, preferably from 0.001 to 100 ppm, more preferably from 0.005 to 50 ppm.

In one embodiment, the composition for improving stress tolerance of the invention comprises at most 3% of hydroxycinnamic acid derivative monomer, expressed in percent relative to the total hydroxycinnamic derivative oligomers of the composition, preferably at most 2%, more preferably at most 1%.

In another embodiment, the composition of the invention comprises at least 10% of hydroxycinnamic acid derivative dimer, expressed in percent relative to the total hydroxycinnamic derivative oligomers of the composition, preferably at least 20%, more preferably at least 30%.

In another embodiment, the composition of the invention comprises at least 70% of hydroxycinnamic acid derivative dimer, expressed in percent relative to the total hydroxycinnamic derivative oligomers of the composition, preferably at least 75%, more preferably at least 80%.

According to one embodiment of the invention, the composition is for improving stress tolerance of a plant, wherein said stress is abiotic or biotic. In one embodiment, said abiotic stress is selected from the group comprising hydric stress, drought, osmotic stress, thermal stress, nutrient deficiency, and chemical stress generated by metallic or organic pollutant in the soil to grow said plant, preferably hydric stress, drought or osmotic stress.

The present invention also relates to a composition for improving stress tolerance of a plant as described hereinabove, further comprising at least one water-solubilizing agent.

In one embodiment, the at least one water-solubilizing agent of the invention is selected from the group comprising polysaccharides and polyols. In a particular embodiment, said at least one water-solubilizing agent is a polysaccharide selected from the group comprising chitosan, chitin, chitin-glucan, carboxymethyl cellulose, pectin, hemicellulose, preferably chitosan.

Another object of the invention is a spray comprising a composition as described hereinabove.

The present invention further relates to a seed of plant, wherein said seed is coated with a composition as described hereinabove.

Another object of the invention is the use of a composition comprising at least one hydroxycinnamic acid derivative oligomer for improving stress tolerance of a plant.

The present invention further relates to a method for improving stress tolerance of a plant comprising applying a composition as described hereinabove.

Definitions

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. When specific terms are defined in connection with a particular aspect or embodiment, such connotation is meant to apply throughout this specification, i.e. also in the context of other aspects or embodiments, unless otherwise defined. In the present invention, the following terms have the precise following meanings:

"Oligomer" refers to a macromolecule that consists of a several, and repetitively monomer units linked to each other. In one embodiment, oligomers of the invention are composed of two, three, four or more monomers. In one embodiment of the invention, oligomers are dimers, trimers, tetramers or more.

"Degree of polymerization" refers to the number of monomeric units in the oligomer of the invention. In one embodiment, the degree of polymerization of the at least one hydroxycinnamic acid derivative oligomer is at least 2.

"Oligoferulate" refers to a ferulic acid oligomer, also named ferulate oligomer. A dimer of ferulic acid in particular is an oligomer consisting of two ferulic acid monomers joined by any bonds. Dimer of ferulic acid may also be named diferulic acid or diferulate.

"Improving", in the context of the present invention, may be replaced by inducing, increasing, enhancing and the like.

"Tolerance" refers to the ability of a plant to endure a stress without suffering a substantial alteration in metabolism, growth, productivity and/or viability. In one embodiment of the invention, the stress may be an abiotic stress or a biotic stress.

"Abiotic stress" refers to a stress that occurs as a result of non-living factors influencing the environment in which the plant lives.

"Biotic stress" refers to a stress that occurs as a result of damage done to plants by other living organisms, such as bacteria, viruses, fungi, parasites, beneficial and harmful insects, weeds, and cultivated or native plants.

"ppm" refers to parts per million, i.e. one part per 1,000,000 parts.

"About" preceding a value means plus or less 10% of said value.

DETAILED DESCRIPTION

The present invention relates to a composition comprising at least one hydroxycinnamic acid derivative oligomer.

As used herein, the term "hydroxycinnamic acid derivative" means phenolic or polyphenolic compounds originated from the Mavolanate-Shikimate biosynthesis pathways in plants. This phenolic acid group includes for example, without limitation, ferulic acid, caffeic acid, p-coumaric acid, chlorgenic acid, sinapic acid, curcumin and rosmarinic acids. In one embodiment, a hydroxycinnamic acid derivative is a monohydroxycinnamic acid, a dihydroxycinnamic acid, a trihydroxycinnamic acid, a methylated hydroxycinnamic acid, or an ester or conjugate of hydroxycinnamic acid derivative. In one embodiment, hydroxycinnamic acid derivatives according to the invention do not include hydrolysis compounds.

In one embodiment, the at least one hydroxycinnamic acid derivative oligomer of the composition of the invention is an oligomer of monohydroxycinnamic acid. Examples of monohydroxycinnamic acids include, but are not limited to, coumaric acids such as, for example p-coumaric acid (4-hydroxycinnamic acid), o-coumaric acid (2-hydroxycinnamic acid) and m-coumaric acid (3-hydroxycinnamic acid), or a mixture thereof.

In another embodiment, the at least one hydroxycinnamic acid derivative oligomer of the composition of the invention is an oligomer of dihydroxycinnamic acid. Examples of dihydroxycinnamic acids include, but are not limited to, caffeic acid (3,4-dihydroxycinnamic acid), umbellic acid (2,4-dihydroxycinnamic acid), 2,3-dihydroxycinnamic acid, 2,5-dihydroxycinnamic acid, and 3,5-dihydroxycinnamic acid, or a mixture thereof.

In another embodiment, the at least one hydroxycinnamic acid derivative oligomer of the composition of the invention is an oligomer of trihydroxycinnamic acid. Examples of trihydroxycinnamic acids include, but are not limited to, 3,4,5-trihydroxycinnamic acid and 3,4,6-trihydroxycinnamic acid, or a mixture thereof.

In another embodiment, the at least one hydroxycinnamic acid derivative oligomer of the composition of the invention is an oligomer of methylated acid. Examples of methylated hydroxycinnamic acids include, but are not limited to, ferulic acid (3-methoxy-4-hydroxycinnamic acid), 5-hydroxyferulic acid and sinapinic acid (3,5-dimethoxy-4-hydroxycinnamic acid), or a mixture thereof.

In one embodiment, the composition of the invention comprises at least one ester or conjugate oligomer of hydroxycinnamic acid derivative. Examples of esters or conjugates of hydroxycinnamic acid derivatives include, but are not limited to, caftaric acid, cichoric acid, chlorogenic acid and coutaric acid, or a mixture thereof.

In one embodiment, the at least one hydroxycinnamic acid derivative of the invention is selected from the group comprising ferulic acid, coumaric acid, caffeic acid and sinapinic acid, or a mixture thereof. In a preferred embodiment, the at least one hydroxycinnamic acid derivative of the invention is ferulic acid or coumaric acid, or a mixture thereof. In a more preferred embodiment, the at least one hydroxycinnamic acid derivative of the invention is ferulic acid or p-coumaric acid, or a mixture thereof.

In one embodiment, the at least one hydroxycinnamic acid derivative oligomer of the composition of the invention is selected from the group comprising oligomers of ferulic acid, oligomers of coumaric acid, oligomers of caffeic acid and oligomers of sinapinic acid, or a mixture thereof. In a preferred embodiment, the at least one hydroxycinnamic acid derivative oligomer of the composition of the invention is an oligomer of ferulic acid or an oligomer of coumaric acid, or a mixture thereof. In a more preferred embodiment, the at least one hydroxycinnamic acid derivative oligomer of the composition of the invention is an oligomer of ferulic acid or an oligomer of p-coumaric acid, or a mixture thereof.

In one embodiment, the at least one hydroxycinnamic acid derivative oligomer of the composition of the invention has a degree of polymerization of at least 2.

In one embodiment, the at least one hydroxycinnamic acid derivative oligomer of the composition of the invention has a degree of polymerization 2, 3, 4, 5, 6, 7, 8, 9, 10 or more. Accordingly, in one embodiment, the at least one hydroxycinnamic acid derivative oligomer of the composition is a dimer, a trimer, a tetramer, a pentamer, a hexamer, a heptamer, an octamer, a nonamer, a decamer, or more. In a particular embodiment, the at least one hydroxycinnamic acid derivative oligomer of the composition is a dimer.

According to one embodiment of the invention, the composition comprises dimer of ferulic acid (also named diferulic acid, or diferulate). In one embodiment, the composition does not comprise ferulic acid.

In one embodiment, the composition of the invention comprises a mixture of hydroxycinnamic acid derivative oligomers having different degrees of polymerization.

As an example, without limitation, the composition may comprise a mixture of ferulic acid dimers, trimers, tetramers, hexamers and more.

Cinnamic acid and its derivatives, in particular ferulic acid are natural products abundant in plants. For instance, the concentration in plants of monomeric ferulic acid is two to four times higher than the total concentration of diferulic oligomers (Phytochemistry. 2014, 102:126-136). Also, it is known that oligomers of cinnamic acid and its derivatives are naturally far less abundant, which means that plant cell walls contain a large majority of monomeric compounds in comparison to other forms such as dimers or trimers.

Therefore, in one embodiment, the composition of the invention comprises at most 10% of hydroxycinnamic acid derivative monomer expressed in percent relative to the total hydroxycinnamic derivative oligomers of the composition.

In one embodiment, the composition of the invention comprises at most about 9%, 8%, 7%, 6%, 5%, or 4% of hydroxycinnamic acid derivative monomer expressed in percent relative to the total hydroxycinnamic derivative oligomers of the composition.

In a preferred embodiment, the composition of the invention comprises at most 3% of hydroxycinnamic acid derivative monomer, expressed in percent relative to the total hydroxycinnamic derivative oligomers of the composition, preferably at most 2%, more preferably at most 1%.

In a more preferred embodiment, the composition of the invention comprises at most about 0.9%, 0.8%, 0.7%, 0.6%, 0.5%, 0.4%, 0.3%, 0.2% or 0.1% of hydroxycinnamic acid derivative monomer expressed in percent relative to the total hydroxycinnamic derivative oligomers of the composition.

In an even more preferred embodiment, the composition of the invention comprises from about 0.01% to about 0.5% of hydroxycinnamic acid derivative monomer expressed in percent relative to the total hydroxycinnamic derivative oligomers of the composition, preferably from about 0.03% to about 0.3%, more preferably from about 0.05% to about 0.1%, even more preferably from about 0.07% to about 0.09%.

In one embodiment, the composition of the invention comprises at most 10% of hydroxycinnamic acid derivative monomer expressed in percent relative to the total components of the composition.

In one embodiment, the composition of the invention comprises at most about 9%, 8%, 7%, 6%, 5%, or 4% of hydroxycinnamic acid derivative monomer expressed in percent relative to the total components of the composition.

In a preferred embodiment, the composition of the invention comprises at most 3% of hydroxycinnamic acid derivative monomer, expressed in percent relative to the total components of the composition, preferably at most 2%, more preferably at most 1%.

In a more preferred embodiment, the composition of the invention comprises at most about 0.9%, 0.8%, 0.7%, 0.6%, 0.5%, 0.4%, 0.3%, 0.2% or 0.1% of hydroxycinnamic acid derivative monomer expressed in percent relative to the total components of the composition.

In an even more preferred embodiment, the composition of the invention comprises from about 0.01% to about 0.5% of hydroxycinnamic acid derivative monomer expressed in percent relative to the total components of the composition, preferably from about 0.03% to about 0.3%, more preferably from about 0.05% to about 0.1%, even more preferably from about 0.07% to about 0.09%.

In a particular embodiment, the composition of the invention comprises substantially no hydroxycinnamic acid derivative monomer.

In one embodiment, the composition of the invention does not comprise hydroxycinnamic acid derivative monomer. Accordingly, in a particular embodiment, the composition of the invention does not comprise ferulic acid, coumaric acid, caffeic acid or sinapinic acid.

In one embodiment, the composition of the invention comprises at least 30% of hydroxycinnamic acid derivative oligomer, expressed in percent relative to the total components of the composition.

In a preferred embodiment, the composition comprises at least 35% of hydroxycinnamic acid derivative oligomer, expressed in percent relative to the total components of the composition, preferably at least 40%, 45%, 50%, 55%, 60%, or 65%.

In another embodiment, the composition comprises at least 70%, 75%, 80%, 85%, 90%, or 95% of hydroxycinnamic acid derivative oligomer expressed in percent relative to the total components of the composition.

In a preferred embodiment, the composition comprises at least 80%, 81%, 82%, 83%, 84%, 85%, 86%, 87%, 88%, 89%, 90%, 91%, 92%, 93%, 94%, 95%, 96%, 97%, 98%, 99% or 100% of hydroxycinnamic acid derivative oligomer expressed in percent relative to the total components of the composition.

In one embodiment, the composition of the invention comprises at least one hydroxycinnamic acid derivative oligomer and at least one hydroxycinnamic acid derivative monomer, wherein the ratio between the at least one hydroxycinnamic acid derivative oligomer and the at least one hydroxycinnamic acid derivative monomer is at least of 2. In other words, in one embodiment, the composition comprises at least twice as hydroxycinnamic acid derivative oligomer than hydroxycinnamic acid derivative monomer.

In a particular embodiment, the ratio between the at least one hydroxycinnamic acid derivative oligomer and the at least one hydroxycinnamic acid derivative monomer is at least of 5 or 10. In one embodiment, the ratio between the at least one hydroxycinnamic acid derivative oligomer and the at least one hydroxycinnamic acid derivative monomer is at least of 15, 20, 25, 26, 27, 28, 29, 30, 31, 32 or more.

In one embodiment, the ratio hydroxycinnamic acid derivative oligomer:hydroxycinnamic acid derivative monomer of the composition of the invention is at least 30:1, preferably at least 31:1, more preferably at least 32:1. In one embodiment, the ratio hydroxycinnamic acid derivative oligomer:hydroxycinnamic acid derivative monomer of the composition of the invention is about 30:1, about 31:1, or 32:1.

In one embodiment, the composition of the invention comprises at least 30% of hydroxycinnamic acid derivative dimer, expressed in percent relative to the total hydroxycinnamic derivative oligomers of the composition, preferably at least 35%, more preferably at least 40%, 45%, 50%, 55%, 60%, or 65%.

In another embodiment, the composition comprises at least 70%, 75%, 80%, 85%, 90%, or 95% of hydroxycinnamic acid derivative dimer expressed in percent relative to the total hydroxycinnamic derivative oligomers of the composition.

In a preferred embodiment, the composition comprises at least 80%, 81%, 82%, 83%, 84%, 85%, 86%, 87%, 88%, 89%, 90%, 91%, 92%, 93%, 94%, 95%, 96%, 97%, 98%, 99% or 100% of hydroxycinnamic acid derivative dimer expressed in percent relative to the total hydroxycinnamic derivative oligomers of the composition.

In one embodiment, the composition of the invention comprises at least 30% of hydroxycinnamic acid derivative dimer, expressed in percent relative to the total components of the composition.

In a preferred embodiment, the composition comprises at least 35% of hydroxycinnamic acid derivative dimer, expressed in percent relative to the total components of the composition, preferably at least 40%, 45%, 50%, 55%, 60%, or 65%.

In another embodiment, the composition comprises at least 70%, 75%, 80%, 85%, 90%, or 95% of hydroxycinnamic acid derivative dimer expressed in percent relative to the total components of the composition.

In a preferred embodiment, the composition comprises at least 80%, 81%, 82%, 83%, 84%, 85%, 86%, 87%, 88%, 89%, 90%, 91%, 92%, 93%, 94%, 95%, 96%, 97%, 98%, 99% or 100% of hydroxycinnamic acid derivative dimer expressed in percent relative to the total components of the composition.

In one embodiment, the composition of the invention comprises at most about 3% of hydroxycinnamic acid derivative monomer expressed in percent relative to the total components of the composition, and at least 70% of hydroxycinnamic acid derivative oligomer, preferably hydroxycinnamic acid derivative dimer, expressed in percent relative to the total components of the composition.

In a particular embodiment, the composition of the invention comprises at most about 1% of hydroxycinnamic acid derivative monomer expressed in percent relative to the total components of the composition, and at least 75% of hydroxycinnamic acid derivative oligomer, preferably hydroxycinnamic acid derivative dimer, expressed in percent relative to the total components of the composition.

In a particular embodiment, the composition of the invention comprises from about 0.01% to about 0.5% of hydroxycinnamic acid derivative monomer expressed in percent relative to the total components of the composition, preferably from about 0.03% to about 0.3%, more preferably from about 0.05% to about 0.1%, even more preferably from about 0.07% to about 0.09%; and at least 80% of hydroxycinnamic acid derivative oligomer, preferably hydroxycinnamic acid derivative dimer, expressed in percent relative to the total components of the composition, preferably at least 81%, 82%, 83%, 84%, 85%, 86%, 87%, 88%, 89%, 90% or more.

In a particular embodiment, the composition of the invention comprises from about 0.07% to about 0.09% of hydroxycinnamic acid derivative monomer expressed in percent relative to the total components of the composition; and at least 80% of hydroxycinnamic acid derivative dimer expressed in percent relative to the total components of the composition, preferably at least 81%, 82%, 83%, 84%, 85%, 86%, 87%, 88%, 89%, 90% or more.

In one embodiment, the composition of the invention comprises at most about 3% of hydroxycinnamic acid derivative monomer expressed in percent relative to the total hydroxycinnamic derivative oligomers of the composition, and at least 70% of hydroxycinnamic acid derivative dimer expressed in percent relative to the total hydroxycinnamic derivative oligomers of the composition.

In a particular embodiment, the composition of the invention comprises at most about 1% of hydroxycinnamic acid derivative monomer expressed in percent relative to the total hydroxycinnamic derivative oligomers of the composition, and at least 75% of hydroxycinnamic acid derivative dimer expressed in percent relative to the total hydroxycinnamic derivative oligomers of the composition.

In a particular embodiment, the composition of the invention comprises from about 0.01% to about 0.5% of hydroxycinnamic acid derivative monomer expressed in percent relative to the total hydroxycinnamic derivative oligomers of the composition, preferably from about 0.03% to about 0.3%, more preferably from about 0.05% to about 0.1%, even more preferably from about 0.07% to about 0.09%; and at least 80% of hydroxycinnamic acid derivative dimer expressed in percent relative to the total hydroxycinnamic derivative oligomers of the composition, preferably at least 81%, 82%, 83%, 84%, 85%, 86%, 87%, 88%, 89%, 90% or more.

In a particular embodiment, the composition of the invention comprises from about 0.07% to about 0.09% of hydroxycinnamic acid derivative monomer expressed in percent relative to the total hydroxycinnamic derivative oligomers of the composition; and at least 80% of hydroxycinnamic acid derivative dimer expressed in percent relative to the total hydroxycinnamic derivative oligomers of the composition, preferably at least 81%, 82%, 83%, 84%, 85%, 86%, 87%, 88%, 89%, 90% or more.

In one embodiment, the composition of the invention is an aqueous composition.

The effective concentration of the hydroxycinnamic acid derivative oligomer in the composition of the invention will vary depending on the hydroxycinnamic acid derivative oligomer type, the crops being treated, the severity of the stress (e.g. drought), the result desired, and the life stage of the plant crops, among other factors.

In one embodiment, the composition of the invention comprises from 0.0001 to 200 ppm (parts per million) of the at least one hydroxycinnamic acid derivative oligomer, preferably from 0.001 to 100 ppm, more preferably from 0.005 to 50 ppm.

In another embodiment, the composition of the invention comprises from 1 to 200 ppm of the at least one hydroxycinnamic acid derivative oligomer, preferably from 5 to 100 ppm, more preferably from 10 to 50 ppm. In a particular embodiment, the composition of the invention comprises about 15 or 16 ppm of the at least one hydroxycinnamic acid derivative oligomer. In a particular embodiment, the composition of the invention comprises about 50 ppm of the at least one hydroxycinnamic acid derivative oligomer.

In another embodiment, the composition of the invention comprises from 0.0001 to 10 ppm of the at least one hydroxycinnamic acid derivative oligomer, preferably from 0.001 to 5 ppm, more preferably from 0.005 to 2.5 ppm.

In one embodiment, the composition of the invention comprises from 0.0001 to 200 mg/L of the at least one hydroxycinnamic acid derivative oligomer, preferably from 0.001 to 100 mg/L, more preferably from 0.005 to 50 mg/L.

In another embodiment, the composition of the invention comprises from 1 to 200 mg/L of the at least one hydroxycinnamic acid derivative oligomer, preferably from 5 to 100 mg/L, more preferably from 10 to 50 mg/L. In a particular embodiment, the composition of the invention comprises about 15 or 16 mg/L of the at least one hydroxycinnamic acid derivative oligomer. In a particular embodiment, the composition of the invention comprises about 50 mg/L of the at least one hydroxycinnamic acid derivative oligomer.

In another embodiment, the composition of the invention comprises from 0.0001 to 10 mg/L of the at least one hydroxycinnamic acid derivative oligomer, preferably from 0.001 to 5 mg/L, more preferably from 0.005 to 2.5 mg/L.

In one embodiment, the composition of the invention comprises from $1 \cdot 10^{-8}$ to $2 \cdot 10^{-2}\%$ of the at least one hydroxycinnamic acid derivative oligomer, preferably from $1 \cdot 10^{-7}$ to $1 \cdot 10^{-2}\%$, more preferably from $5 \cdot 10^{-7}$ to $5 \cdot 10^{-3}\%$. In another embodiment, the composition of the invention comprises from $1 \cdot 10^{4}$ to $2 \cdot 10^{-2}\%$ of the at least one hydroxycinnamic acid derivative oligomer, expressed in weight percent relative to the total weight of the composition, preferably from $5 \cdot 10^{4}$ to $1 \cdot 10^{-2}\%$, more preferably from $1 \cdot 10^{-3}$ to $5 \cdot 10^{-3}\%$. In a particular embodiment, the composition of the invention comprises about $1.5 \cdot 10^{-3}$ or $1.6 \cdot 10^{-3}\%$ of the at least one hydroxycinnamic acid derivative oligomer, expressed in weight percent relative to the total weight of the composition. In a particular embodiment, the composition of the invention comprises about $5 \cdot 10^{-3}\%$ of the at least one hydroxycinnamic acid derivative oligomer, expressed in weight percent relative to the total weight of the composition. In another embodiment, the composition of the invention comprises from $1 \cdot 10^{-8}$ to $1 \cdot 10^{-3}\%$ of the at least one hydroxycinnamic acid derivative oligomer, expressed in weight percent relative to the total weight of the composition, preferably from $1 \cdot 10^{-7}$ to $5 \cdot 10^{-4}\%$, more preferably from $5 \cdot 10^{-7}$ to $2.5 \cdot 10^{-4}\%$.

The composition according to the invention may further comprise a co-formulant selected from the group comprising: diluting agents, buffer agents, surfactants (dispersing agents, anti-foaming or de-foaming agents, spreader, deposition adjuvant penetration enhancers or humectants), anti-freeze agents (urea, ethylene glycol, propylene glycol or glycerol), preservative agents (potassium sorbate, paraben and its derivates, 1,2-benzisothiazol-3(2H)-one or essential oils), absorbent agents (including raids of corn or sawdust), thickeners (including clays or xanthane gum), sticker agents (including latex, silicon or alkoxylated alkyl), adjuvant for crop protection or a mixture thereof.

According to one embodiment, the composition of the invention further comprises a diluting agent. As used herein, the term "diluting agent" means an aqueous or non-aqueous solution which is used for diluting the at least one hydroxycinnamic derivative oligomer of the composition. Examples of diluting agents include, but are not limited to, water, saline, polyethylene glycol, propylene glycol, ethanol, oil and the like.

According to one embodiment, the composition of the invention further comprises a buffer agent. As used herein, the term "buffer agent" means an aqueous solution comprising a mixture of acids and bases which is used to stabilize the pH of the composition. Examples of buffer agents include, but are not limited to, TRIS, phosphate, carbonate, acetate, citrate, glycolate, lactate, borate, tartrate, carcodylate, ethanolamine, glycine, imidazole and the like.

In one embodiment, the composition of the invention has an acidic pH. As used herein, the term "acidic pH" means a pH value inferior or equal to 7. In one embodiment, the composition of the invention has a pH inferior or equal to 6. In one particular embodiment, the composition of the invention has a pH of about 5.5.

According to one embodiment, the composition of the invention further comprises an organic acid. As used herein, the term "organic acid" means an organic compound with acidic properties. Preferably, the organic acid is a carboxylic acid. Examples of organic acids include, but are not limited to, lactic acid, succinic acid, malic acid, and citric acid. In one particular embodiment, the composition of the invention comprises lactic acid.

The invention also relates to a composition as described hereinabove, further comprising at least one solubilizing agent, preferably a water-solubilizing agent.

As used herein, the term "water-solubilizing agent" means a compound which makes soluble or more soluble the at least one hydroxycinnamic derivative oligomer of the invention in water.

In one embodiment, the solubilizing agent, preferably the water-solubilizing agent, is selected from the group comprising positively or negatively charged biopolymer, polysaccharides and polyols. In a preferred embodiment, the solubilizing agent, preferably the water-solubilizing agent, is a polysaccharide or sulfated polysaccharide.

In one embodiment, the polysaccharide or sulfated polysaccharide is cationic.

In one embodiment, the solubilizing agent, preferably the water-solubilizing agent, is a polysaccharide selected from the group comprising chitosan, chitin, chitin-glucan, carboxymethyl cellulose, pectin, hemicellulose. In a particular embodiment, the solubilizing agent, preferably the water-solubilizing agent is chitosan or chitin-glucan.

In one embodiment, the solubilizing agent, preferably the water-solubilizing agent, is a polyol selected from the group comprising mannitol and sorbitol.

According to one embodiment of the invention, the composition comprises diferulic acid (diferulate) and a polysaccharide, preferably a cationic polysaccharide. According to a preferred embodiment of the invention, the composition comprises diferulic acid (diferulate) and chitosan.

In one embodiment, the composition of the invention comprises from 0.01 to 10% of the at least one solubilizing agent, expressed in weight percent relative to the total weight of the composition, preferably from 0.05 to 5%, more preferably from 0.1 to 2%. In a particular embodiment, the composition of the invention comprises about 0.4% of the at least one solubilizing agent. In another particular embodiment, the composition of the invention comprises about 0.5% of the at least one solubilizing agent.

In another embodiment, the composition of the invention comprises from 100 to 100.000 ppm of the at least one solubilizing agent, preferably from 500 to 50.000 ppm, more preferably from 1.000 to 20.000 ppm. In a particular embodiment, the composition of the invention comprises about 4.000 ppm of the at least one solubilizing agent. In another particular embodiment, the composition of the invention comprises about 5.000 ppm of the at least one solubilizing agent.

In another embodiment, the composition of the invention comprises from $1 \cdot 10^{-6}$ to $2 \cdot 10^{-3}$% of the at least one solubilizing agent, preferably from $5 \cdot 10^{-6}$ to $1 \cdot 10^{-3}$%, more preferably from $1 \cdot 10^{-5}$ to $5 \cdot 10^{-4}$%. In a particular embodiment, the composition of the invention comprises from $5 \cdot 10^{-5}$ to $2.5 \cdot 10^{-4}$% of the at least one solubilizing agent.

In another embodiment, the composition of the invention comprises from 0.01 to 20 ppm of the at least one solubilizing agent, preferably from 0.05 to 10 ppm, more preferably from 0.1 to 5 ppm. In a particular embodiment, the composition of the invention comprises from 0.5 to 2.5 ppm of the at least one solubilizing agent.

According to one embodiment, hydroxycinnamic acid derivative oligomers of the invention are prepared "in situ" by enzyme-catalyzed polymerization of hydroxycinnamic acid derivative oligomer in the presence of a solubilizing agent as described hereinabove. In this case, the solubilizing agent acts also as a template controlling the polymerization reaction. In a particular embodiment, the solubilizing agent acting as a polymerization template is chitosan and enzyme is laccase.

According to one embodiment, the composition of the invention may further comprise any biostimulating agent, plant growth regulators or hormone-containing products known in the art for improving stress tolerance of a plant such as, for example, humic acids, fulvic acids, fucoidan, antitranspirants, oligosaccharides and the like.

This invention further relates to a composition for improving tolerance of plants in adverse environmental conditions comprising at least one hydroxycinnamic acid derivative oligomer. In one embodiment, the adverse environmental condition is also called a stress.

In one embodiment, the stress for which the composition of the invention improves the plant tolerance is an abiotic stress or a biotic stress.

As used herein, the term "tolerance" may be replaced by resistance or defense, protection, support, strength, toughness, endurance, vigor, resilience, struggle, and the like.

According to one embodiment, the abiotic stress may be hydric stress, drought, osmotic stress, thermal stress, nutrient deficiency, and chemical stress generated by metallic or organic pollutant in the soil to grow said plant. In a preferred embodiment, the abiotic stress is selected from the group comprising hydric stress, drought and osmotic stress.

Drought tolerance (drought resistance) is a general concept, according to the different types of reactions that include drought resistance (dehydration avoidance), drought tolerance and recovery (drought recovery). Here the concept is also extended to erratic rain and temporal lack of water (for instance related to global warming modification of the environment).

In one embodiment, the composition comprising at least one hydroxycinnamic acid derivative oligomer is for improving tolerance of a plant to hydric stress. In another embodiment, the composition comprising at least one hydroxycinnamic acid derivative oligomer is for improving tolerance of a plant to drought. In another embodiment, the composition comprising at least one hydroxycinnamic acid derivative oligomer is for improving tolerance of a plant to osmotic stress.

In one embodiment, the composition for improving tolerance of a plant to hydric stress comprises diferulate. In another embodiment, the composition for improving tolerance of a plant to drought comprises diferulate. In another embodiment, the composition for improving tolerance of a plant to osmotic stress comprises diferulate.

According to another embodiment, the biotic stress may be due to bacteria, viruses, fungi, parasites, beneficial insects, harmful insects, weeds, cultivated plants or native plants.

In one embodiment, the at least one hydroxycinnamic acid derivative oligomer of the composition of the invention is not used as an antioxidant.

In one embodiment, the plant of the invention is a monocotyledon plant. In another embodiment, the plant of the invention is a dicotyledon plant.

In one embodiment, the plant of the invention is selected from the group comprising cotton, flax, vine, fruit, vegetable, major horticultural and forest crops, such as: *Rosaceae* sp., *Ribesioidae* sp., *Juglandaceae* sp., *Betulaceae* sp., *Anacardiaceae* sp., *Fagaceae* sp., *Moraceae* sp., *Oleaceae* sp., *Actinidaceae* sp., *Lauraceae* sp., *Musaceae* sp., *Rubiaceae* sp., *Theaceae* sp., *Sterculiceae* sp., *Rutaceae* sp., *Solanaceae* sp., *Vitaceae* sp. *Liliaceae* sp., *Asteraceae* sp., *Umbelliferae* sp., *Cruciferae* sp., *Chenopodiaceae* sp., *Cucurbitaceae* sp., *Papilionaceae* sp., such as *Graminae* sp., *Fabacae* sp., as well as genetically modified homologues of these crops.

In one embodiment, the plant is a food crop selected from the group comprising wheat, rice, corn, soy bean, potato, barley, oat, red bean and millet. In another embodiment, the plant is a vegetable crop selected from the group comprising tomato, radish, cress, cucumber, cabbage, watermelon, melon, cabbage, Chinese cabbage, scallion, onion, carrot, zucchini, and *Arabidopsis thaliana*. In another embodiment, the plant is a fruit crop selected from the group comprising apple, pear, date, peach, kiwi, grape, orange, persimmon, plum, apricot, banana, and tangerine. In another embodiment, the plant is a special crop selected from the group comprising mustard, *ginseng*, tobacco, cotton, sesame, sugar cane, sugar beet, peanut and rapeseed. In another embodiment, the plant is a flower crop selected from the group comprising rose, *gerbera, gladiolus*, carnation, *chrysanthemum*, lily, and tulip. In another embodiment, the plant is a feed crop selected from the group comprising rye grass, red clover, orchard grass, alfalfa, and tall fescue.

In one embodiment, the plant is selected from the group comprising tomato, radish, wheat, cress, mustard, soy bean and *Arabidopsis thaliana*. In a particular embodiment, the plant is tomato. In another embodiment, the plant is radish. In another embodiment, the plant is wheat. In another embodiment, the plant is cress. In another embodiment, the plant is mustard. In another embodiment, the plant is soy bean. In another embodiment, the plant is *Arabidopsis thaliana*.

Another object of the invention is the use of a composition comprising at least one hydroxycinnamic acid derivative oligomer as described herein above for improving stress tolerance of a plant. In one embodiment, the composition of the invention is used as a biostimulant for improving stress tolerance of a plant. In one embodiment, the composition of the invention is a biostimulant composition for improving stress tolerance of a plant. In one embodiment, the composition of the invention is used as a biopesticide for improving stress tolerance of a plant. In one embodiment, the composition of the invention is a biopesticidal composition for improving stress tolerance of a plant.

The composition of the invention can be prepared as a formulation such as, for example, emulsion, oil, hydrate, powder, granule, tablet, aerosol, suspension and the like. In one embodiment, if necessary, an emulsifying agent, a suspending agent, a spreading agent, a penetrating agent, a wetting agent, a thickening agent, and/or a stabilizer can be incorporated in the formulation. In one embodiment, the formulation of the invention may be prepared according to a method known in the art.

According to one embodiment, the composition or formulation of the invention can be applied to plants by various means, including, but not being limited to, sprays, sprinklers, drips, dips, drenches, dressings, irrigation and oils.

According to one embodiment, the composition or formulation of the invention is applied in liquid form. Examples of liquid forms include, but are not limited to, foliar sprays, turf sprays, in-furrow sprays, seedling dips, seedling drenches, root dips, root drenches, stem drenches, tuber drenches, fruit drenches, soil drenches, soil drips, and soil injections.

According to another embodiment, the composition or formulation of the invention is applied in dry form. Examples of dry forms include, but are not limited to, granules, microgranules, powders, pellets, sticks, flakes, crystals, and crumbles.

In one embodiment, the composition of the invention is adapted to be applied on the plant. In a particular embodiment, the composition of the invention is adapted to be sprayed on the plant. In another embodiment, the composition of the invention is invention is adapted to coat parts of the plant. In a particular embodiment, the composition of the invention is a coating composition, preferably a seed-coating composition.

In one embodiment, the composition of the invention is to be applied on the plant. In one embodiment, the composition may be applied on aerial parts of the plant, such as for example leaves and stems. In another embodiment, the composition may be applied on underground parts of the plant, such as for example on roots. In another embodiment, the composition may be applied on seeds.

In one embodiment, the composition of the invention is to be coated on the plant before planting. In one embodiment, the composition is coated on plant seed before planting.

In one embodiment, the composition of the invention can be applied pure or diluted.

In one embodiment, the concentration of the composition of the invention depends on its application. In one embodiment, the composition of the invention is less concentrated when the composition is adapted to be sprayed on the plant than when the composition is a coating composition, preferably a seed-coating composition. As used herein, the term "less concentrated" means that when the composition is adapted to be sprayed on the plant, the composition is at least 2 times less concentrated than when the composition is a coating composition, in particular a seed-coating composition, preferably at least 3, 4, 5, 6, 7, 8, 9 or 10 times less concentrated.

In one embodiment, the composition of the invention comprises from 0.0001 to 10 ppm of the at least one hydroxycinnamic acid derivative oligomer, preferably from 0.001 to 5 ppm, more preferably from 0.005 to 2.5 ppm, when the composition is adapted to be sprayed on the plant. In another embodiment, the composition of the invention comprises from 1 to 200 ppm of the at least one hydroxycinnamic acid derivative oligomer, preferably from 5 to 100 ppm, more preferably from 10 to 50 ppm, when the composition is a coating composition, preferably a seed-coating composition.

In one embodiment, the composition of the invention comprises from 0.01 to 20 ppm of the at least one solubilizing agent, preferably from 0.05 to 10 ppm, preferably from 0.1 to 5 ppm, more preferably from 0.5 to 2.5 ppm, when the composition is adapted to be sprayed on the plant. In another embodiment, the composition of the invention comprises from 0.01 to 10% of the at least one solubilizing agent, expressed in weight percent relative to the total weight of the composition, preferably from 0.05 to 5%, more preferably from 0.1 to 2%, when the composition is a coating composition, preferably a seed-coating composition.

Another object of the invention is an apparatus for atomizing the composition of the invention under dispersal conditions suitable for spraying on a plant. In one embodiment, the apparatus is a spray comprising a composition of the invention as described hereinabove. In one embodiment, the spray of the invention may be an aerosol spray. As used herein, an aerosol spray is a spray used with a container that can contain a liquid under pressure such as, for example, a can, a bottle, or a tank.

In one embodiment, the spray of the invention may be used manually. Examples of spray used manually include, but are not limited to, bottles with a hand-pumped sprayer and hose-end sprayer. In another embodiment, the spray of the invention may be used mechanically. Examples of spray used mechanically include, but are not limited to, self-propelled row-crop sprayer.

In one embodiment, the spray of the invention is a foliar spray. In one embodiment, the composition of the invention is a spray composition.

Another object of the invention is a plant seed coated with a composition of the invention as described hereinabove. The present invention encompasses seeds of plants described hereinabove having an improved tolerance to stress.

The present invention also relates to a method for improving stress tolerance of a plant comprising applying a composition as described hereinabove on the plant.

The present invention also relates to a method for improving stress tolerance of a plant comprising applying on the plant a composition comprising at least one hydroxycinnamic acid derivative oligomer, preferably diferulic acid.

In one embodiment, the method of the invention comprises applying a composition comprising at least one hydroxycinnamic acid derivative oligomer and at least one solubilizing agent, preferably chitosan, on the plant.

In one embodiment, the method of the invention comprises applying the composition of the invention on the plant. In one embodiment, the composition is applied on aerial parts of the plant, preferably leaves and/or stems. In another embodiment, the composition is applied on underground parts of the plant, preferably roots. In another embodiment, the method of the invention comprises coating seeds of the plant before planting.

According to one embodiment, the plant may be further treated for stress tolerance by any method known in the art.

Another object of the invention is a method for promoting plant growth comprising applying a composition according to the invention on said plant.

The present invention further relates to a method inducing phenlylalanine-ammonia lyase (PAL) activity and/or peroxide ($H_2O_2$) production comprising applying a composition according to the invention on said plant. PAL is a crucial enzyme with regulator activity in the phenylpropanoid pathway dealing with precursors of secondary metabolites in plant, playing therefore a key role in a range of plant-pathogen interactions (Morrison and Buxton, Crop Sci. 1993, 33:1264-1268). $H_2O_2$ are produced in one or more bursts of oxidative activity during resistance expression in a wide range of plant host/pathogen interactions and have been implicated in stimulation of the hypersensitive response, a mechanism used to prevent the spread of infection by microbial pathogens (Apel and Hirt, Annu Rev Plant Biol. 2004, 55:373-399). Therefore, the increase of PAL activity and of $H_2O_2$ production both play a significant role in the plant resistance to biotic stress.

Another object of the invention is a method for modulating Proline (Pro) content of a plant comprising applying a composition according to the invention on said plant. Proline accumulation is a common physiological response in many plants in response to a wide range of stresses. Proline accumulation is believed to play adaptive roles in plant stress tolerance, transgenic approaches have confirmed the beneficial effect of proline overproduction during stress. Moreover, the balance between biosynthesis and degradation of Pro is also thought to be essential in the determination of the osmoprotective and developmental functions of proline (Verbruggen and Hermans, Amino Acids. 2008, 35:753-759). Therefore, modulating proline content of a plant may improve plant resistance to a wide variety of stresses, whether biotic or abiotic.

The present invention also relates to a method for increasing water content of a plant, preferably after a drought period, comprising applying a composition according to the invention on said plant.

The present invention further relates to a method for increasing the recovery rate of a plant after rewatering, such as for example after an episodic drought or a rainfall after a prolonged period of drought, comprising applying a composition according to the invention on said plant.

BRIEF DESCRIPTION OF THE DRAWINGS

FIG. 1 is a HPLC chromatogram of the oligoferulates solution obtained by enzymatic reaction using laccase.

FIG. 2 is a graph showing the amount of proline in tomato leaves after 24 hours of a foliar application of oligoferulates at different concentrations. Values of the mean+/−SE are reported (n=3).

FIG. 3 is a graph showing the germination percentage of radish seeds, 72 hours after a treatment with oligoferulates for 30 minutes (3 repetitions, 20 seeds per repetition). Values of the mean+/−SE are reported (n=3).

FIG. 4 is a graph showing radish seedlings fresh weight after 72 hours of germination of seeds treated with oligoferulates for 30 minutes (3 repetitions, 20 seeds per repetition). Values of the mean+/−SE are reported (n=3).

FIG. 5 is a graph showing the germination percentage of radish seeds, 4 days after a treatment with a solution of 0.05 mM oligoferulates, a solution of 0.1% chitosan, or a solution comprising 0.05 mM oligoferulates and 0.1% chitosan (solution further called “oligoferulates composition”) followed by dispersion onto plates containing 50 mL of a 125 mM of mannitol in order to simulate osmotic stress conditions.

FIG. 6 is a photograph showing control (left) and wheat plants treated with an oligoferulates composition (treated, right) after seven days under simulated drought stress (A) and one day after re-watering (B).

FIG. 7 is a histogram showing the fresh weight control and wheat seedlings treated with an oligoferulates composition (treated) seven days under simulated drought stress followed by one day of re-watering. Values of the mean+/−SE are reported (n=3). ANOVA tests indicate statistically significant differences (P<0.05) between plants treated by an oligoferulates composition and control solution.

Figure 10:
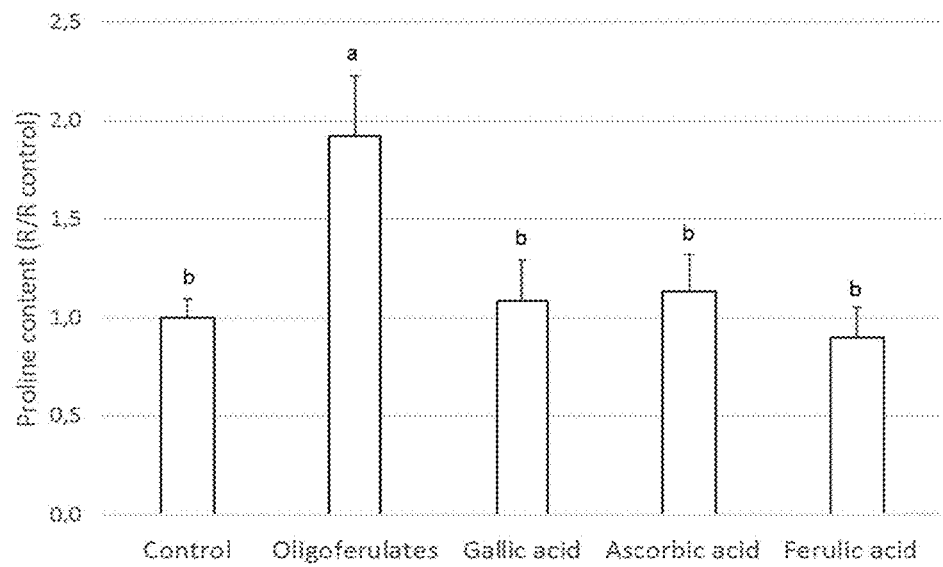

FIG. 10 is a histogram showing the amount of proline in tomato leaves after 24 hours of a foliar application of the different formulations. Values of the mean+/−SE are reported (n=3). ANOVA tests indicate statistically significant differences (P<0.05) between plants treated with the formulation and control solution containing Tween 80.

Figure 11:
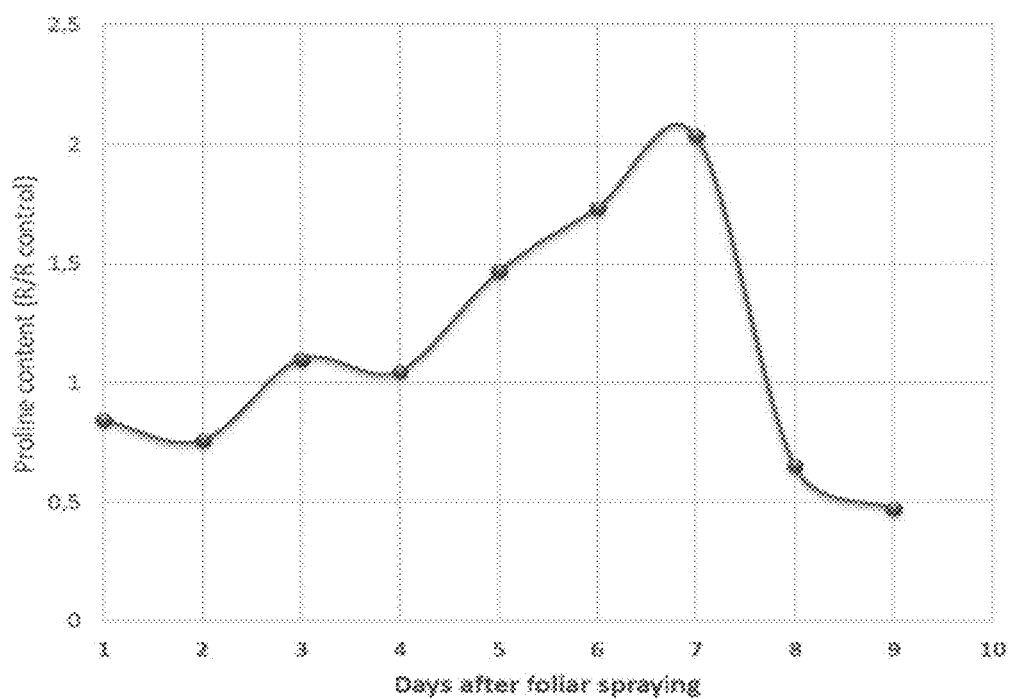

FIG. 11 is a graph showing the dynamic of proline content in wheat leaves after foliar spraying of an oligoferulates formulation.

EXAMPLES

The present invention is further illustrated by the following examples. In no case the scope of the present invention is limited by these examples.

Example 1: Preparation of Oligomers of Ferulic Acid Using a Laccase as Enzyme

A solution of 5 mM ferulic acid in methanol (50 mL) was added to 180 mL of ethyl acetate. After mixing, 200 mL of solution of laccase 1 U/mL (Sigma-38429, Laccase from *Trametes versicolor*) in 50 mM sodium acetate buffer (pH 5.0) was added, and the reaction carried out at 25° C. for 24 hours by shaking on an orbital shaker at 150 rpm. Upon termination of reaction, the organic phase was separated using a separation funnel and the aqueous phase washed twice with ethyl acetate. All ethyl acetate extracts were evaporated under reduced pressure using a rotary evaporator.

HPLC Analysis

RP-HPLC analysis was carried out using a Waters Symmetry C-18 column (46×250 mm) in a Waters Alliance separation module 2695 coupled with a Waters UV detector at 320 nm. The mobile phase consisted of acetonitrile/1% acetic acid (30:70) mixture and the flow rate was 1 mL/min and separation was carry out at room temperature. Before injection, samples were filtered through Sartorious filters (0.45 μm).

Figure 1:
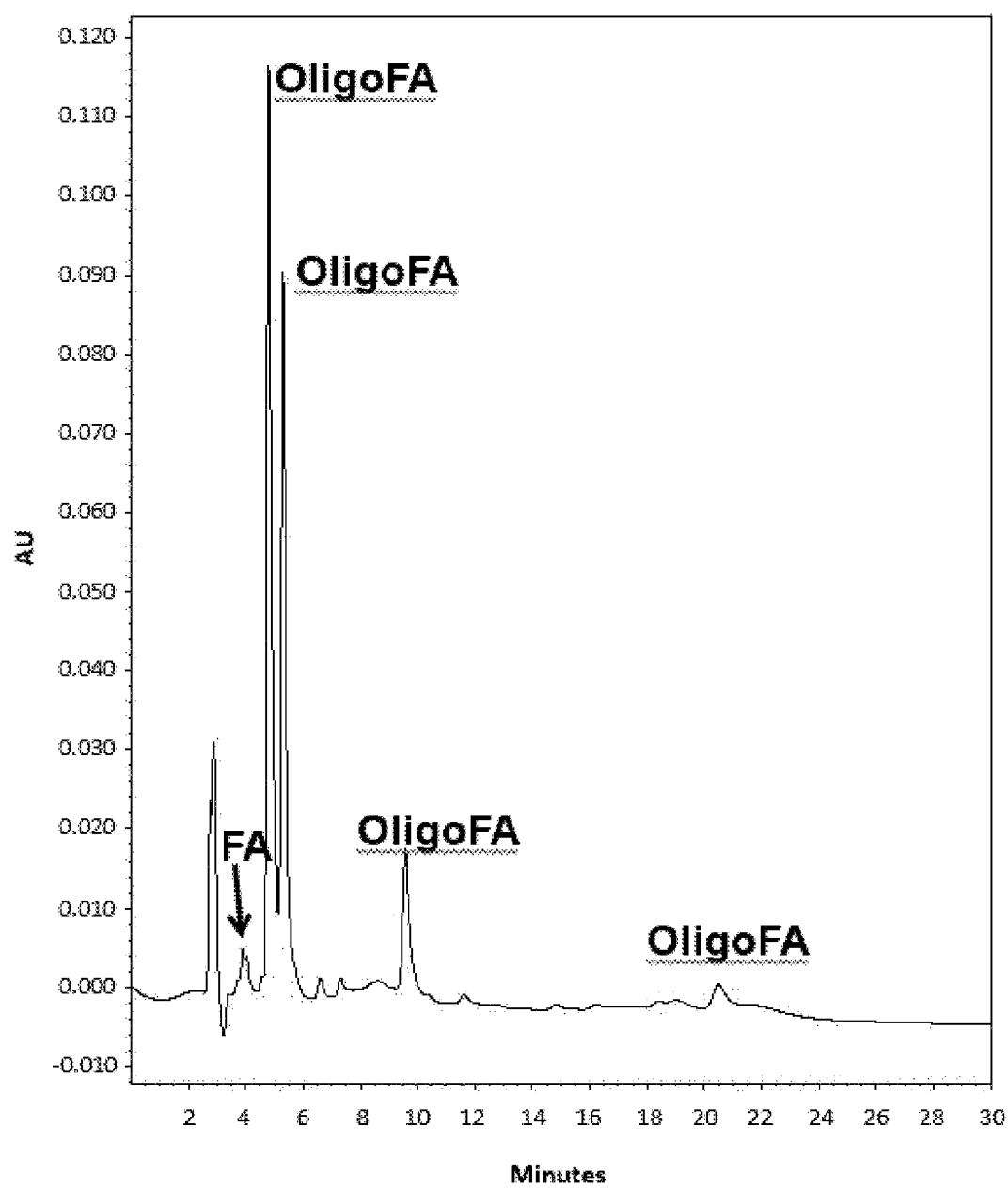

HPLC chromatogram of the sample shows a very small ferulic acid (FA) peak compared to peaks corresponding to oligoferulates (oligoFA) (FIG. 1).

For quantitative purposes, standard solutions of ferulic acid (W518301 Aldrich) were prepared at different concentrations using methanol as a solvent and were injected in triplicate, the detector responses were measured for constructing the calibration curve. A good linear relationship was obtained when a graph was plotted for concentration vs ferulic acid peak (at retention time=4 min) area with a correlation coefficient $r^2$=0.9991 in the concentration range of 0.005 to 0.1 mg/L. The equation of linear regression equation was y=2E+08x−113942.

Assuming a similar response factor for detected oligoferulates (oligoFA) and monomeric ferulic acid (FA), the ratio oligoferulates:ferulic acid in the reaction product is 32:1. However, the response factor for oligoferulates should normally be lower than the response factor for ferulic acid. Therefore, the ratio oligoferulates:ferulic acid in the reaction product should be even higher than 32:1.

Mass Spectrometry Analysis

In order to determine accurately the molecular weight of the oligoferulates obtained, a mass spectrometry analysis was carried out as follow: 1 μL of the sample solution was dropped on the spectrometer target and after drying, 1 μL of a matrix solution DHB/$CH_3CN$ was placed on the sample spot and after drying the spectra were recorded on a Bruker Ultraflex mass spectrometer (Bruker Daltonik, Bremen, Germany) in the reflector mode using external calibration and working in the positive ion mode. The composition of the oligoferulates obtained is presented in Table 1.

TABLE 1

Assigned ion composition of MALDI-TOF-MS spectra of oligoferulates obtained by enzymatic reaction using laccase

| Oligoferulate | Ion composition | m/z* |
| --- | --- | --- |
| Dimer | $[M + Na]^+$ | 409 |
| Tetramer | $[M + Na]^+$ | 793 |
| Hexamer | $[M + Na]^+$ | 1177 |
| Octamer | $[M + Na]^+$ | 1561 |

*m/z represents mass divided by charge number of ions.

Example 2: Preparation of Oligomers of Ferulic Acid Using a Peroxidase as Enzyme A solution of 50 mM ferulic acid in methanol (200 mL) was added to a mix of 400 mL of methanol, 80 mL of hydrogen peroxide 0.3% and 600 mL of 50 mM phosphate buffer (pH 7.0). After mixing, 10 mL of solution of 1% horseradish peroxidase (245.7 U/mg, AMRESCO INC) in 50 mM phosphate buffer (pH 7.0) was added and the reaction carried out at 25° C. for 24 hours by shaking on an orbital shaker at 150 rpm. Upon termination of reaction, the reaction mixture was filtered and the precipitate washed twice with methanol. The methanol filtrate and the soluble phase of the reaction were evaporated under reduced pressure using a rotary evaporator.

The reaction products were re-dissolved in methanol and a TLC analysis was performed on silica gel plates (MERCK 60. GF-254) using benzene:dioxane:acetic acid (25:7:1, v/v/v) as the mobile phase. In addition, a RP-HPLC analysis was carried out using a Waters Symmetry C-18 column (46×250 mm) in a Waters Alliance separation module 2695 coupled with a Waters UV detector at 320 nm. The mobile phase consisted of acetonitrile:1% acetic acid (30:70) mixture and the flow rate was 1 mL/min. Before injection, the samples were filtered through Sartorious filters (0.45 μm).

Example 3: Foliar Spraying of Diferulate Oligomers Increase Proline Content in Tomato Plants in a Dose-Response Pattern Materials and Methods Tomato plants of the variety "moneymaker" were growth for 3 weeks on soil under controlled conditions (light/dark regime of 16 h/8 h respectively, at 24° C.). Formulations containing diferulate at increased concentrations, and Tween 80 (Polysorbate 80) at 0.01% as emulsifier were sprayed on the tomato leaves till run off. A solution of Tween 80 at 0.01% was used as control. After 24 hours, the true leaves from plants treated by spraying were collected and ground in liquid nitrogen.

Proline (Pro) was estimated in tomato leaves according to Bates et al. (Plant and Soil. 1973, 39:205-207) based on proline's reaction with ninhydrin. A 500 mg fresh leaf samples were homogenized in 5 mL of 3% aqueous sulphosalycylic acid and centrifuged at 22000 g for 5 min. The supernatant was filtered through Sartorious filters (0.45 µm). To 1 mL of the filtrate, 1 mL of ninhydrin reagent (2.5 g ninhydrin/100 mL of a solution containing glacial acetic acid, distilled water and ortho-phosphoric acid 85% at a ratio of 6:3:1) was added and boiled in a water bath at 100° C. for 1 h. Readings were taken immediately at a wavelength of 546 nm. The proline concentration was determined from a standard curve using proline (sigma) and calculated on a fresh weight basis (mmol proline. g FW-1).

Results

Figure 2:
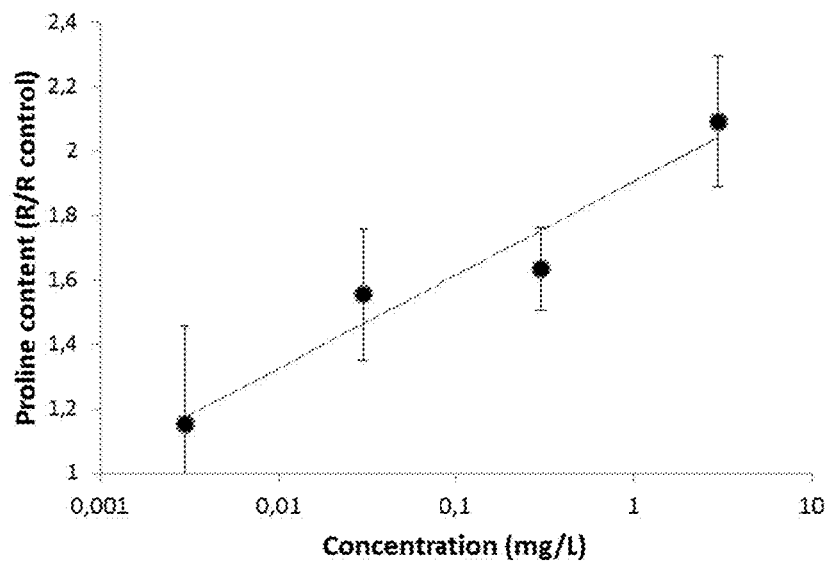

Results presented in FIG. 2 show that at low concentration, diferulate oligomers enable the control of Pro content in plant and that it follows a positive linear correlation in relation with the applied doses (dose-response).

ANOVA tests indicate statistically significant differences ($p<0.05$) between plants treated with the formulation and control solution containing Tween 80.

As accumulation of proline in plants is known to have both osmoprotectory and antioxidant functions, results show that diferulate oligomers enhance osmoprotection and protection against oxidative damage of the plant.

Example 4: Radish Seeds Treatment with Oligoferulates Increases Germination Rate and Seedling Growth Materials and Methods Radish (*Raphanus sativus*) seeds of the variety Ronde rode were incubated during 30 min in a solution of 15 ppm of oligoferulates or water (Control). Test was repeated 3 times for each treatment, 20 seeds per repetition. Seeds were then dried and placed in an incubator at 30° C. for optimal germination in water, without stress. After 3 days, germinated seeds were counted and radish seedlings collected and weighted.

Results

Figure 3:
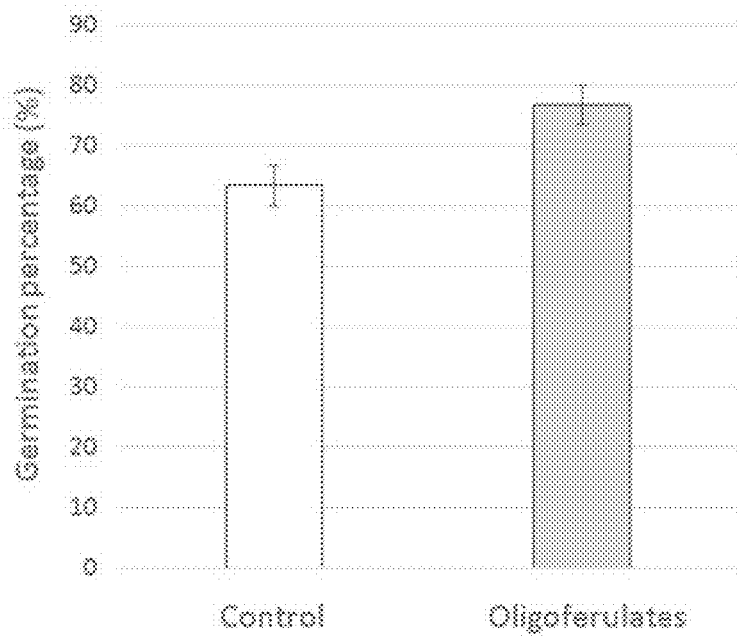

Results show that radish seeds treated with oligoferulates have about 15% higher germination percentage than in the control where seeds were incubated with water (62% of germination for the control, 77% for the oligoferulates-treated seeds; FIG. 3).

Figure 4:
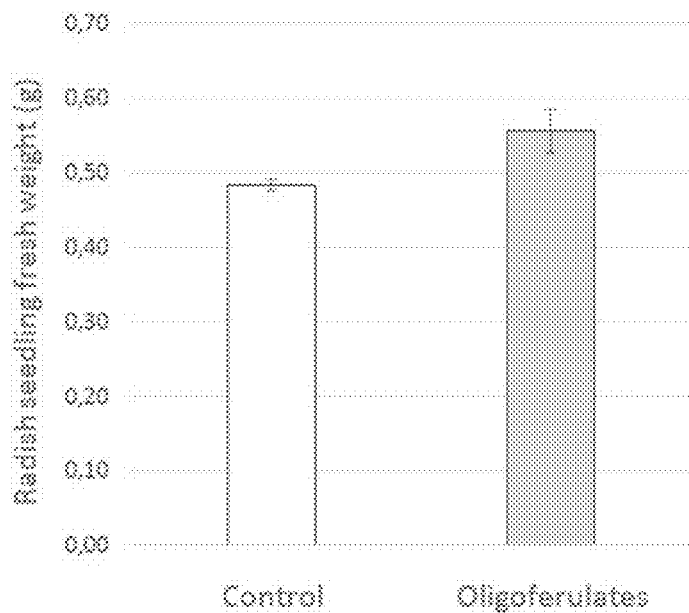

Similarly, radish seedlings of seeds treated with oligoferulates present a faster growth of about 14% in comparison to seeds not treated (0.49 g of fresh weight for the control, 0.56 g for the oligoferulates-treated seeds; FIG. 4).

These results show that oligoferulates are able to modify the plant behavior, even under non stressed conditions.

Example 5: Treatment of Radish Seeds with Oligoferulates or a Composition Comprising Oligoferulates and Chitosan to Enhance Plant Germination Under Stress Conditions Materials and Methods Radish (*Raphanus sativus*) seeds of the variety Ronde rode were incubated 5 min in water (as control), solution of 0.05 mM oligoferulates, solution of 0.1% chitosan, or a solution comprising 0.1% chitosan and 0.05 mM oligoferulates (solution further called "oligoferulates composition").

After being dried, coated seeds were dispersed onto plates containing 50 mL of a 125 mM of mannitol in order to induce osmotic stress conditions. Plates were sealed with Parafilm M® to prevent dehydration and left for incubation at 30° C. After 4 days, germinated seeds were counted and germination percentage calculated.

Results

Figure 5:
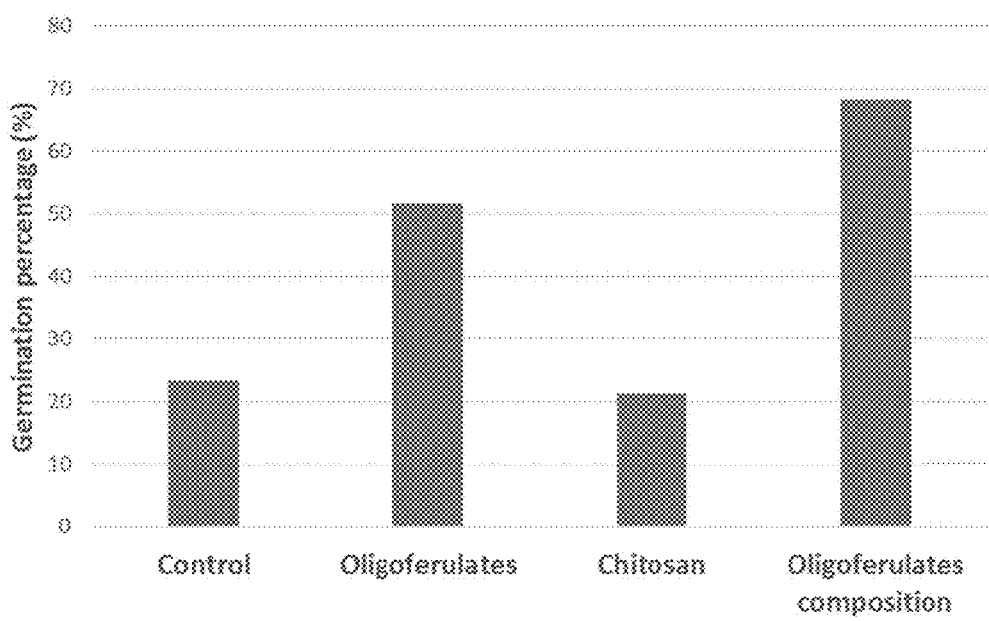

Results show that radish seeds pretreated with a solution comprising oligoferulates alone significantly increase the germination percentage of radish seeds under stress conditions (52% of germinated seeds for the oligoferulates treated seeds and 23% of germinated seeds for the control) (FIG. 5).

On the contrary, radish seed treated with exclusively chitosan show a comparable germination percentage than control seeds (21% of germinated seeds for the chitosan treated seeds) (FIG. 5).

In another hand, radish seeds pretreated with a solution comprising oligoferulates and chitosan (oligoferulates composition) show a very significant increase of the germination percentage in comparison to control, with 68% of germinated seeds (FIG. 5).

This results reveal that applying oligoferulates, or even better an oligoferulates composition (oligoferulates and chitosan), show an enhanced plant germination in respect to control or chitosan alone.

Example 6: Seed-Coating with an Oligoferulates Composition Induces Tolerance in Wheat Plants to Drought Stress Materials and Methods Seeds of wheat plant were coated with a composition comprising 0.005% of diferulate and 0.5% of chitosan (hereinafter named "oligoferulates composition"), and water (as control). After drying, six seeds of wheat per pots (3 pots per treatment) were planted and wheat plants growth for 3 weeks on soil under controlled conditions (light/dark regime of 16 h/8 h respectively, at 24° C.). At that moment, irrigation was suspended, and no further water was added in order to simulate a situation of drought stress. After seven days under this condition, irrigation was restored, mimicking episodic drought or rainfall after a prolonged period of drought. The capacity of the plant to recover was estimated the day after, based on total fresh weight of the wheat plants.

Results

Figure 6:
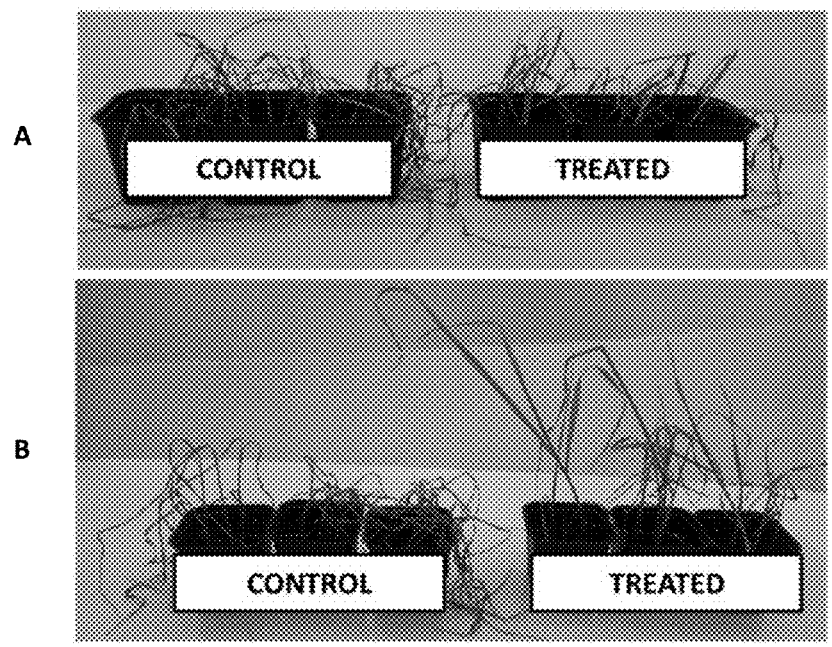
Figure 7:
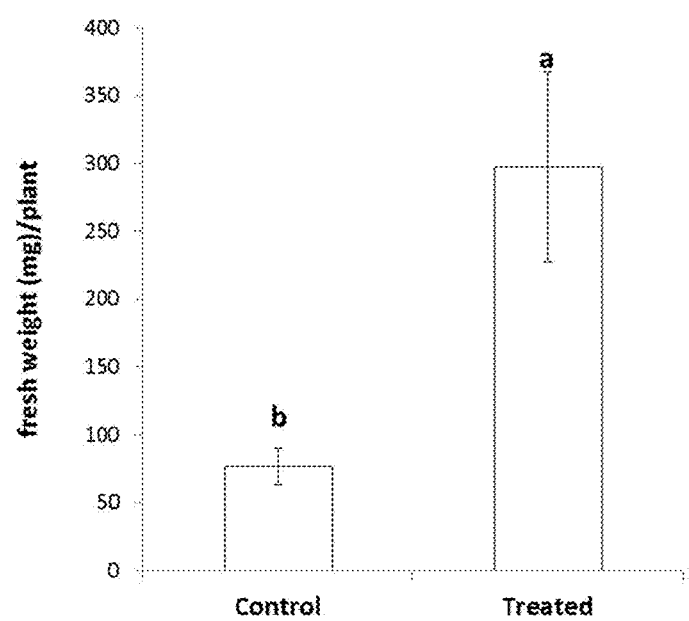

Results show that this severe drought stress has irreversibly injured tissue apparatus of the untreated plants (control, FIGS. 6A and 6B left, and FIG. 7), whereas plants treated with the oligoferulates composition show an interestingly high recovery (treated, FIGS. 6A and 6B right, and FIG. 7).

Therefore, the oligoferulates composition may help plants to respond better to episodic drought or scares watering pulses which is remarkably helpful to implement vegetation management practices in climatic changing conditions.

Example 7: Seed-Coating with a Composition Comprising Hydroxycinnamic Acid Oligomers and Chitosan Induces Tolerance in Wheat Plants to Drought Stress Materials and Methods Oligomers of ferulic acid, caffeic acid and coumaric acid were prepared using chitosan as polymerization template and laccase from *Trametes versicolor* (Sigma-38429) as catalyst. Each reaction mix comprises 50 mL of 50 mM hydroxycinnamic acid in methanol, 10 g of chitosan, 15 U of laccase and 450 mL of phosphate buffer (50 mM, pH 7.0).

The reactions were carried out at 30° C. for 4 h in a magnetic stirred reactor under atmospheric conditions. The oligomers grafted on chitosan were recovered by filtering the reaction medium under vacuum and washing with an abundant amount of phosphate buffer (50 mM, pH 7.0) to remove all traces of enzyme adsorbed.

Seeds of radish plant were coated with a solution comprising 0.35% of each hydroxycinnamic oligomer grafted on chitosan. After drying, seeds were planted and radish plants were grown for 3 weeks on soil under controlled conditions (light/dark regime of 16 h/8 h respectively, at 24° C.). At that moment, irrigation was suspended, and no further water was added in order to simulate a situation of drought stress. After one week under this drought stress condition, irrigation was restored and the capacity of the plant to recover estimated based on the fresh weight of the radish plants.

Results

Results are presented in Table 2.

TABLE 2

Fresh weight of radish plants after irrigation was restored

|  | Fresh weight of radish plant* (g/plant) |
| --- | --- |
| Radish seed coated with water (Control) | 2.03 ± 0.20 |
| Radish seed coated with oligomers of ferulic acid grafted on chitosan | 2.98 ± 0.18 |
| Radish seed coated with oligomers of caffeic acid grafted on chitosan | 2.38 ± 0.12 |
| Radish seed coated with oligomers of coumaric acid grafted on chitosan | 2.78 ± 0.22 |

*values of the mean +/− SE are reported

Results show that coating seeds with a composition comprising oligomers of ferulic acid, caffeic acid and coumaric acid significantly increase the fresh weight of plant in conditions that simulate drought stress. Plants pre-treated by seed coating with such compositions have thus been more resistant to drought stress than untreated plants.

Therefore, these results demonstrate that compositions comprising hydroxycinnamic acid derivative oligomers may be used to improve plant tolerance to an abiotic stress.

Example 8: Mixture of Oligoferulate and Chitosan Induces Plant Defense Reaction in *Arabidopsis thaliana* Cells Cultured In Vitro Plant cell suspension cultures are widely used in plant pathology as a useful tool for the screening of molecules acting as elicitors of a wide range of plant defense responses against infection by pathogens. Among them, PAL activation and $H_2O_2$ accumulation are two widely used biochemical marker of plant resistance activation to biotic stresses.

Materials and Methods

Cells Suspension from *Arabidopsis thaliana* strain L-MM1 were grown in Murashige and Skoog medium (4.43 g/L) with sucrose (30 g/L) and 0.5 μg/mL of alpha-naphthaleneacetic acid (NAA) and 0.05 μg/mL of Kinetin, pH 5.7. Cultures were maintained under a 16 h/8 h light/dark photoperiod, at 25° C., on a rotary shaker at 100 rpm. Cells were diluted 10-fold in fresh medium every 7 days. In this bioassays, the composition comprising 0.005% of oligoferulates and 0.5% of chitosan (hereinafter named "oligoferulates composition") was prepared at different concentrations, filtered through a 0.22 μm membrane filter (Millipore) and aseptically added to 5 mL of 3 days-old suspension-cultured cells and left to incubate 24 hours at 24° C. under mild agitation. Water was used as control. The reaction mixture was centrifuged at 4° C. for 5 min at max RCF of 100 g at 4° C. to collect the cells (for PAL activity measurement) and supernatant (for $H_2O_2$ measurement).

PAL Activity

After centrifugal, cells were homogenized at 4° C. in 1 ml of 0.1 M borate buffer (pH 8.8) containing 2 mM mercaptoethanol. The homogenate was centrifuged at 4000 rpm for 10 minutes at 4° C. PAL (EC 4.3.1.5) activity was determined in 0.125 ml supernatant in the presence of 1.37 ml 0.1 M borate buffer (pH 8.8) supplemented with 60 mM L-Phenylalanine as described by Beaudoin-Eagan and Thorpe (Plant Physiol. 1985; 78(3):438-41). Protein concentration of the extracts was determined by the Bradford protein assay (Bio-Rad).

$H_2O_2$ Measurement $H_2O_2$ concentration was measured in the supernatant using the Amplex Red hydrogen peroxide/Peroxidase Assay Kit (Molecular Probes) according to the supplier's instructions.

Results

PAL Activity

Figure 8:
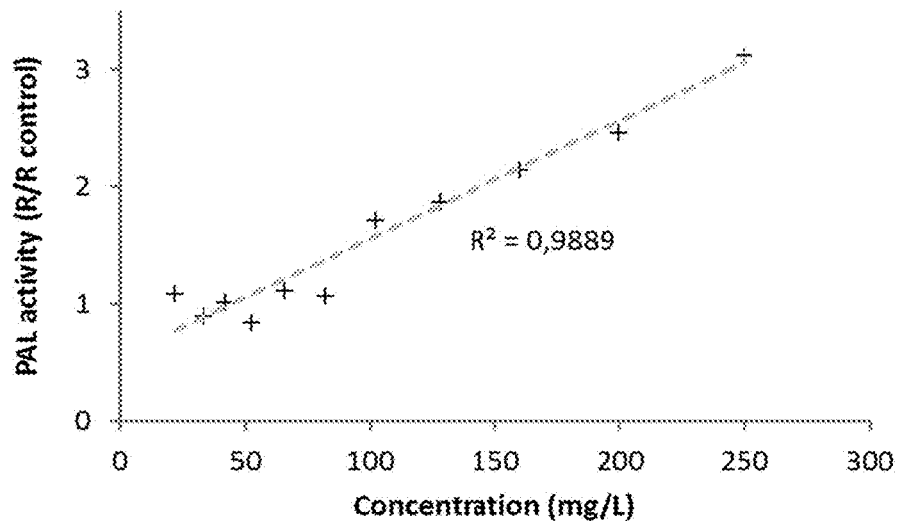
FIG. 8 is a graph showing the dose-response curve of PAL activity in *Arabidopsis thaliana* cell suspensions 24 h after application of a composition comprising oligoferulates. Data were expressed as response of each sample divided by the response induced by a control treatment (water) in that experiment (R/R control).

Results show that PAL activity increases in a dose-dependent manner according to the concentration of oligoferulates in the composition (FIG. 8). Therefore, oligoferulates of the composition induce PAL activation of the plant, which is a marker of plant resistance activation. These results thus demonstrate the activation of plant resistance by oligoferulates.

$H_2O_2$ Measurement

Figure 9:
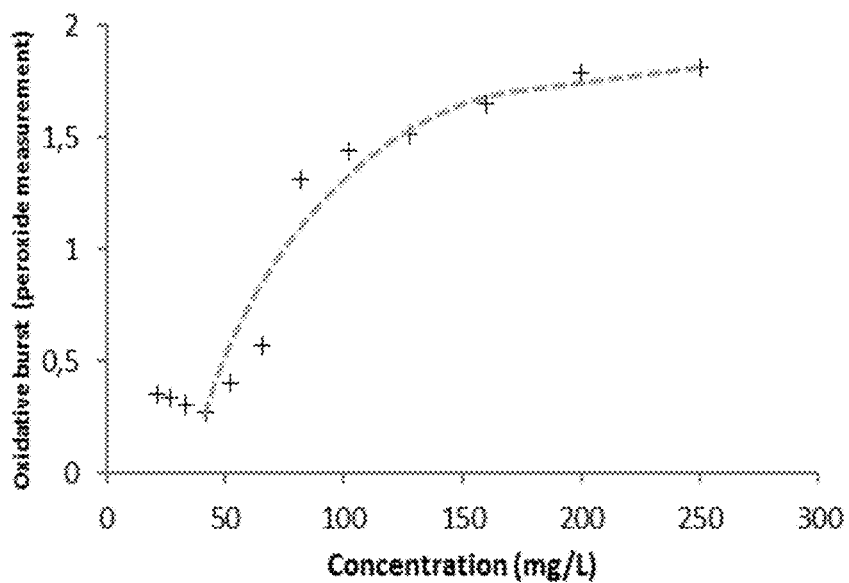
FIG. 9 is a graph showing the dose-response curve of $H_2O_2$ accumulation in *Arabidopsis thaliana* cell suspensions 24 h after application of a composition comprising oligoferulates.

Results show that $H_2O_2$ accumulates in the plant in a dose-dependent manner according to the concentration of oligoferulates in the composition (FIG. 9). Oligoferulates of the composition thus induce $H_2O_2$ accumulation in the plant. As $H_2O_2$ accumulation is a marker of plant resistance activation, these results demonstrate the stimulation of plant resistance by oligoferulates of the invention.

PAL activity and $H_2O_2$ accumulation are markers of the common plant resistance mechanism of defense to a wide range of stress conditions induced by a pathogen. Therefore, these results show that compositions of the invention improve tolerance of a plant against a biotic stress.

Example 9: Foliar Spraying of Oligoferulates on Tomato Plants Induces Proline Accumulation, while Others Antioxidants are Unable Materials and Methods Antioxidant Test The antioxidant activity of oligoferulates prepared as described in example 1, ferulic acid (W518301, Sigma-Aldrich), gallic acid (27645, Sigma-Aldrich) and ascorbic acid (A0278, Sigma-Aldrich) was determined using a method based on the scavenging of the stable radical 2,2-diphenyl-1-picrylhydrazyl (DPPH) (Brand Williams et al, Food Sci Technol-Lebens Wissens Technol. 1995; 28:25-30) and the results expressed as $IC_{50}$ (concentration of antioxidant which reduces the free radical DPPH• about 50%). This method is frequently used to predict the antioxidant activities of different molecules.

Biological Activity

Tomato plants of the variety "moneymaker" were grown for 3 weeks on soil under controlled conditions (light/dark regime of 16 h/8 h respectively, at 24.5° C.). After 24 hours, the true leaves from plants treated by spraying were collected and ground in liquid nitrogen. Formulations containing gallic acid, ascorbic acid, ferulic acid or oligoferulates at the same concentrations (5 ppm), and Tween 80 (Polysorbate 80) at 0.01% as emulsifier were sprayed on the tomato leaves till run off. A solution of Tween 80 at 0.01% was used as control.

Proline (Pro) was estimated in tomato leaves according to Bates et al. (Plant and Soil. 1973, 39:205-207) based on proline's reaction with ninhydrin. A 500 mg fresh leaf samples were homogenized in 5 mL of 3% aqueous sulphosalycylic acid and centrifuged at 22000 g for 5 min. The supernatant was filtered through Sartorious filters (0.45 μm). To 1 mL of the filtrate, 1 mL of ninhydrin reagent (2.5 g ninhydrin/100 mL of a solution 15 containing glacial acetic acid, distilled water and ortho-phosphoric acid 85% at a ratio of 6:3:1) was added and boiled in a water bath at 100° C. for 1 h. Readings were taken immediately at a wavelength of 546 nm. The proline concentration was determined from a standard curve using proline (sigma) and expressed as relative values respect to the content in control treatment as R/R control.

Results
Antioxidant Test

The gallic acid shown the higher antioxidant activity ($IC_{50}$ of 2 μg/mL) followed by the ascorbic acid ($IC_{50}$ of 5 μg/mL) while ferulic acid ($IC_{50}$ of 25 μg/mL) and oligoferulates ($IC_{50}$ of 35 μg/mL) showed a lower antioxidant activity.

Biological Activity

Results show that among the molecules sprinkled on tomato plants, only the formulation comprising oligoferulates showed the ability to induce the accumulation of proline in plants (FIG. 10).

Taken together, these results demonstrate that the biological activity of oligomers of ferulic acid in plants is not related to its antioxidant activity.

Example 10: Foliar Spraying of a Composition Containing Oligoferulates on Wheat Plants Induce Accumulation of Osmo-Protectants (Proline)

Materials and Methods

Wheat plants of the variety "Homero" were grown for 2 weeks on soil under controlled conditions (light/dark regime of 16 h/8 h respectively, at 24.5° C.). A formulation containing tween 80 (Polysorbate 80) at 0.01% as emulsifier and a composition of chitosan (5 mg/L) and oligoferulates (0.15 mg/L) was sprayed on the wheat leaves till run off. A solution containing only tween 80 (Polysorbate 80) at 0.01% was used as control.

Every 24 hours, true leaves from plants treated (and control) by spraying were collected and ground in liquid nitrogen. This way, a time-response curve for proline accumulation induced by foliar spraying of the oligoferulates formulation on wheat plants was established.

Proline (Pro) was estimated in wheat leaves according to Bates et al. (Plant and Soil. 1973, 39:205-207) based on proline's reaction with ninhydrin. The proline concentration was determined from a standard curve using proline (sigma) and expressed as relative values respect to the content in control treatment as R/R control.

Results

Results show that proline accumulation in wheat leaves was strongly dependent on the time after foliar application (FIG. 11). Half-maximum proline accumulation was observed at the day 5 after application. Proline reached a maximum at day 7 and just after declined.

These results demonstrate that application of oligoferulates on a plant induces an increase of the proline content of the plant. Proline accumulation is a common physiological response in many plants in response to a wide range of stresses, including biotic and abiotic stresses. Therefore, application of oligoferulates according to the invention leads to proline accumulation in plant, thereby improving plant stress tolerance.

Example 11: Foliar Spraying of Oligomers of Ferulic Acid, Coumaric Acid and Caffeic Acid on Tomato Plants Induces Proline Accumulation Materials and Methods Oligomers of caffeic acid and coumaric acid were prepared by the same procedure described in example 1 for the preparation of oligomers of ferulic acid. In short, a solution of 5 mM of each hydroxycinnamic acid in methanol (50 mL) was added to 180 mL of ethyl acetate. After mixing, 200 mL of solution of laccase 1 U/mL (Sigma-38429, Laccase from *Trametes versicolor*) in 50 mM sodium acetate buffer (pH 5.0) was added, and the reaction carried out at 25° C. for 24 hours by shaking on an orbital shaker at 150 rpm. At the end, the organic phase was separated using a separation funnel and the aqueous phase washed twice with ethyl acetate. All ethyl acetate extracts were evaporated under reduced pressure using a rotary evaporator to recover the hydroxycinnamic derivative oligomers in powder form.

Tomato plants of the variety "moneymaker" were grown for 3 weeks on soil under controlled conditions (light/dark regime of 16 h/8 h respectively, at 24.5° C.). After 24 hours, the true leaves from plants treated by spraying were collected and ground in liquid nitrogen. Formulations comprising oligomers of ferulic, coumaric or caffeic acid at the same concentrations (5 ppm), and Tween 80 (Polysorbate 80) at 0.01% as emulsifier were sprayed on the tomato leaves till run off. A solution of Tween 80 at 0.01% was used as control. Proline (Pro) was estimated in tomato leaves according to Bates et al. (Plant and Soil. 1973, 39:205-207) based on proline's reaction with ninhydrin. The proline concentration was determined from a standard curve using proline (sigma) and expressed as μmol of proline per fresh weight (g).

Results

Results are presented in Table 3.

TABLE 3

| Proline content in tomato plants seven days after foliar spraying of different oligomers of hydroxycinnamic | |
|---|---|
| | Proline content (μmol/g fresh weight) |
| Formulation comprising Tween 80 (control) | 0.34 ± 0.05 |
| Formulation comprising ferulic acid oligomers (oligoferulates) | 0.84 ± 0.05 |
| Formulation comprising coumaric acid oligomers | 0.53 ± 0.07 |
| Formulation comprising caffeic acid oligomers | 0.54 ± 0.06 |

As shown in Example 10, oligomers of ferulic acid (oligoferulates) induce an increase of the proline content in the plant. Moreover, oligomers of other hydroxycinnamic derivatives, namely coumaric acid oligomers and caffeic acid oligomers, also lead to an accumulation of proline in the plant.

Therefore, these results demonstrate that hydroxycinnamic derivative oligomers are able to modulate the proline content of a plant, thereby improving plant stress tolerance.

The invention claimed is:

1. A composition for improving abiotic stress tolerance in plants comprising:
   at least one hydroxycinnamic acid oligomer comprising dimers, tetramers, hexamers, and octamers of hydroxycinnamic acid,
      wherein said composition comprises from about 0.01% to about 0.5% of hydroxycinnamic acid monomer, expressed in percent relative to the total hydroxycinnamic acid oligomers of the composition, and
      wherein said composition comprises at least 75% of hydroxycinnamic acid dimer, expressed in percent relative to the total hydroxycinnamic acid oligomers of the composition, and
   at least one water-solubilizing agent selected from the group consisting of positively or negatively charged polysaccharides and polyols.

2. The composition according to claim 1, wherein said at least one hydroxycinnamic acid oligomer is selected from the group consisting of oligomer of ferulic acid, oligomer of p-coumaric acid, oligomer of caffeic acid, and oligomer of sinapinic acid.

3. The composition according to claim 1, wherein said at least one water-solubilizing agent is a positively or negatively charged polysaccharide.

4. The composition according to claim 1, wherein said at least one water-solubilizing agent is a polyol.

5. The composition according to claim 3, wherein said polysaccharide is chitosan.

6. The composition according to claim 1, comprising from 0.01 to 10% of the at least one water-solubilizing agent, expressed in weight percent relative to the total weight of the composition.

7. The composition according to claim 5, comprising from 0.01 to 10% of the chitosan, expressed in weight percent relative to the total weight of the composition.

8. A method for improving abiotic stress tolerance of a plant in need thereof; comprising applying to the plant an effective amount of the composition according to claim 1.

9. A method for improving abiotic stress tolerance of a plant in need thereof comprising applying to the plant an effective amount of the composition according to claim 2.

10. The method according to claim 8, wherein said at least one hydroxycinnamic acid oligomer is oligomer of ferulic acid.

11. The method according to claim 8, wherein said composition comprises from 0.0001 to 200 ppm of said at least one hydroxycinnamic acid oligomer.

12. The method according to claim 8, wherein said composition comprises from 0.001 to 100 ppm of said at least one hydroxycinnamic acid oligomer.

13. The method according to claim 8, wherein said composition comprises from 0.005 to 50 ppm of said at least one hydroxycinnamic acid oligomer.

14. The method according to claim 8, wherein said abiotic stress is selected from the group consisting of hydric stress, drought, osmotic stress, thermal stress, nutrient deficiency, and chemical stress generated by metallic or organic pollutant in soil to grow said plant.

15. A method for improving stress tolerance or for modulating proline content of a plant comprising applying the composition according to claim 1 on said plant.

16. A seed of plant, wherein said seed is coated with the composition according to claim 1.

* * * * *